March 15, 1932.  E. A. DUGIED  1,849,742

TRIPOD MOUNTING FOR FIREARMS

Filed July 23, 1931

Inventor
Eugène A. Dugied
by Wilkinson & Mawhinney
Attorneys.

UNITED STATES PATENT OFFICE

EUGÈNE ALBERT DUGIED, OF COURBEVOIE, FRANCE, ASSIGNOR TO SOCIETE ANONYME DES ANCIENS ETABLISSEMENTS HOTCHKISS & COMPAGNIE, OF ST. DENIS, FRANCE, A JOINT-STOCK COMPANY OF FRANCE

TRIPOD MOUNTING FOR FIREARMS

Application filed July 23, 1931, Serial No. 552,771, and in France August 12, 1930.

The present invention has reference to a tripod mounting for machine guns or light guns, which possesses great stability and enables a very accurate fire to be obtained.

Said mounting comprises in the usual manner a head on which the firearm can be mounted, either directly or indirectly, and a three-legged pyramid supporting said head, and the mounting is broadly characterized by the fact that it includes, with a view to locking the head and the three legs completely and simultaneously, a locking screw passing through the centre leg and through shoes for locking segments secured to the head, said screw likewise passing through two plates which are pivoted respectively on each of the fore-heads of the two side legs, so that by screwing a lock nut on the aforementioned screw, the centre leg, the head of the mounting and the two side legs are locked simultaneously.

Other characteristics and features of the invention will become apparent from the ensuing description taken in conjunction with the accompanying drawings in which.

Figure 1:
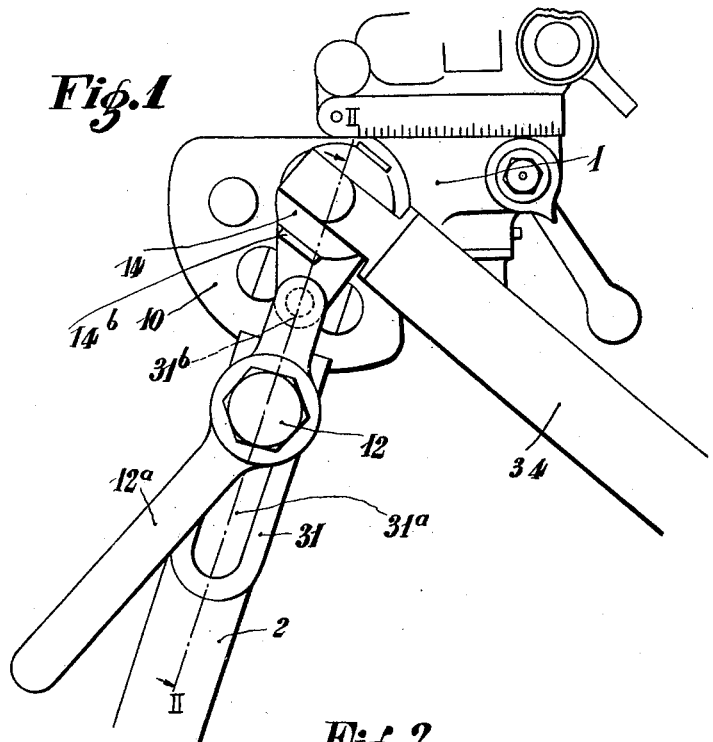
Fig. 1 is a part elevational view of an improved mounting in accordance with the present invention.
Figure 2:
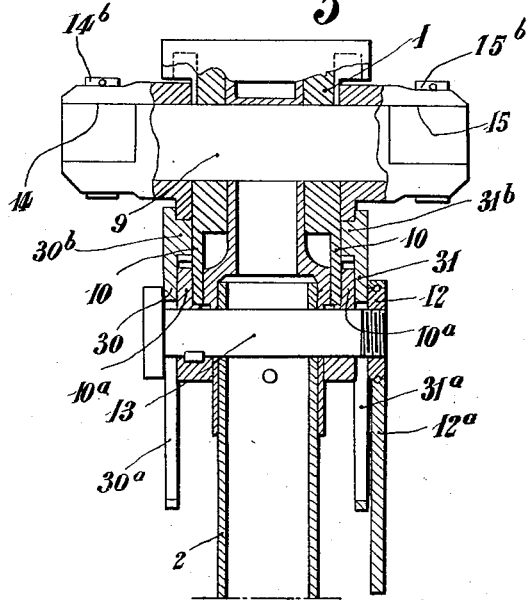
Fig. 2 is a sectional view along the line II—II Fig. 1.

The tripod mounting illustrated in the drawings comprises a head 1 and a three-legged pyramid consisting of a front or centre leg 2 and two side or rear legs 3 and 4 (coincident in Fig. 1).

The firearm or light gun, which has not been illustrated and which partakes of all the movements of the mounting, may be secured in any suitable manner to the head of the mounting.

Said head 1 may swivel about a pin 9 which also forms a pivot for the three legs 2, 3 and 4. The centre leg 2, as also the head of the mounting, is pivoted directly on said pin 9. On the other hand, the side legs 3 and 4 are connected to a corresponding fork 14 or 15, through the medium of a pivot pin 14b or 15b, said pin forming with the corresponding fork, a cardan joint which enables not only each side leg to swivel about the pin 9, but likewise enables said legs to be spread apart or closed together.

The head of the mounting and the three legs are simultaneously locked by means of a locking screw 13, on which may be screwed a nut 12, which can be manipulated through the medium of a lever 12a. Said screw 13 passes not only through the centre leg 2 and shoes such as 10a, for locking segments such as 10, secured to the body 1, but likewise passes through plates 30 and 31, split, as may be seen at 30a and 31a, for the passage of said screw, and pivoted respectively at 30b and 31b on the forks 14 and 15 of the two sidelegs. Under these conditions, when the lock nut 12 is tightened, the centre leg 2, the segments 10 (and hence the mounting 1), and, finally, the two plates 30 and 31 (and hence the two side legs) are locked simultaneously.

After the nut has been locked, the mounting and the three legs form a rigid assembly which may be easily transported without any risk of disadjustment.

I claim:

In a tripod mounting for fire-arms, the combination of a head, a center leg and two side legs supporting said head, said head and center leg being mounted directly on a common pin, fork-heads for mounting said side legs on said common pin, a locking screw passing through said center leg, segments secured to said head, shoes through which said locking screw passes, adapted to press against and lock said segments, plates pivotally mounted on said fork-heads, and a nut screwing on said screw whereby by pressure of said nut and screw transmitted to said shoes and plates said head and three legs are locked simultaneously.

EUGÈNE ALBERT DUGIED.